United States Patent

Pickering et al.

[11] Patent Number: 5,902,487
[45] Date of Patent: May 11, 1999

[54] PROCESS AND APPARATUS FOR DEWATERING A SUSPENSION

[75] Inventors: Carl Anthony Pickering; Peter James Tovey, both of West Yorkshire, United Kingdom

[73] Assignee: Allied Colloids Limited, Bradford, United Kingdom

[21] Appl. No.: 08/894,686

[22] PCT Filed: Apr. 2, 1996

[86] PCT No.: PCT/GB96/00814

§ 371 Date: Aug. 26, 1997

§ 102(e) Date: Aug. 26, 1997

[87] PCT Pub. No.: WO96/31265

PCT Pub. Date: Oct. 10, 1996

[30] Foreign Application Priority Data

Apr. 3, 1995 [GB] United Kingdom ............... 9506842

[51] Int. Cl.⁶ .................................................. C02F 11/14
[52] U.S. Cl. .................... 210/709; 210/738; 210/740; 210/96.1; 210/143; 210/206
[58] Field of Search ............................ 210/709, 740, 210/96.1, 112, 113, 143, 205, 206, 738

[56] References Cited

U.S. PATENT DOCUMENTS

| | | | |
|---|---|---|---|
| 3,348,682 | 10/1967 | Aulich et al. | 210/740 |
| 4,178,243 | 12/1979 | Messer | 210/96.1 |
| 4,226,714 | 10/1980 | Furness et al. | 210/723 |
| 4,336,143 | 6/1982 | Abbott | 210/740 |
| 4,439,325 | 3/1984 | Blais | 210/740 |
| 4,612,123 | 9/1986 | Eustacchio et al. | 210/709 |
| 5,037,559 | 8/1991 | Schmitt | 210/709 |
| 5,417,102 | 5/1995 | Prevost | 209/166 |

FOREIGN PATENT DOCUMENTS

| | | |
|---|---|---|
| 0578032 | 1/1994 | European Pat. Off. . |
| 3025521 | 1/1982 | Germany . |
| 3346834 | 5/1985 | Germany . |
| WO8502836 | 4/1985 | WIPO . |

OTHER PUBLICATIONS

Automation and Optimisation Of Centrifuge Sludge Dewatering, Wat. Sci. Tech., vol. 21, Brighten, pp. 1319–1324, 1989, Gunter Schrank and Clive Murren.

Polykon Brochure, "The Polykon–Process", A concept for more flexibility and productivity.

Primary Examiner—Peter A. Hruskoci
Attorney, Agent, or Firm—David R. Crichton

[57] ABSTRACT

A plant for conditioning and dewatering a suspension comprises a belt press, centrifuge or other continuous dewatering apparatus (3), a flow-line (1) leading to the dewatering apparatus, a pump (2) for causing suspension to flow along the line (1), means (5–9) for dosing conditioner into he suspension at a dosing point (4), means (12) for measuring density D, means (10) for measuring the flow rate V and thereby for calculating the dry mass per unit time M, and control means (16, 17, 18) for automatically dosing a mount A of conditioner into the suspension where A-kM and k is a constant and for automatically varying V in response to D and for automatically varying the constant k in response to D.

10 Claims, 1 Drawing Sheet

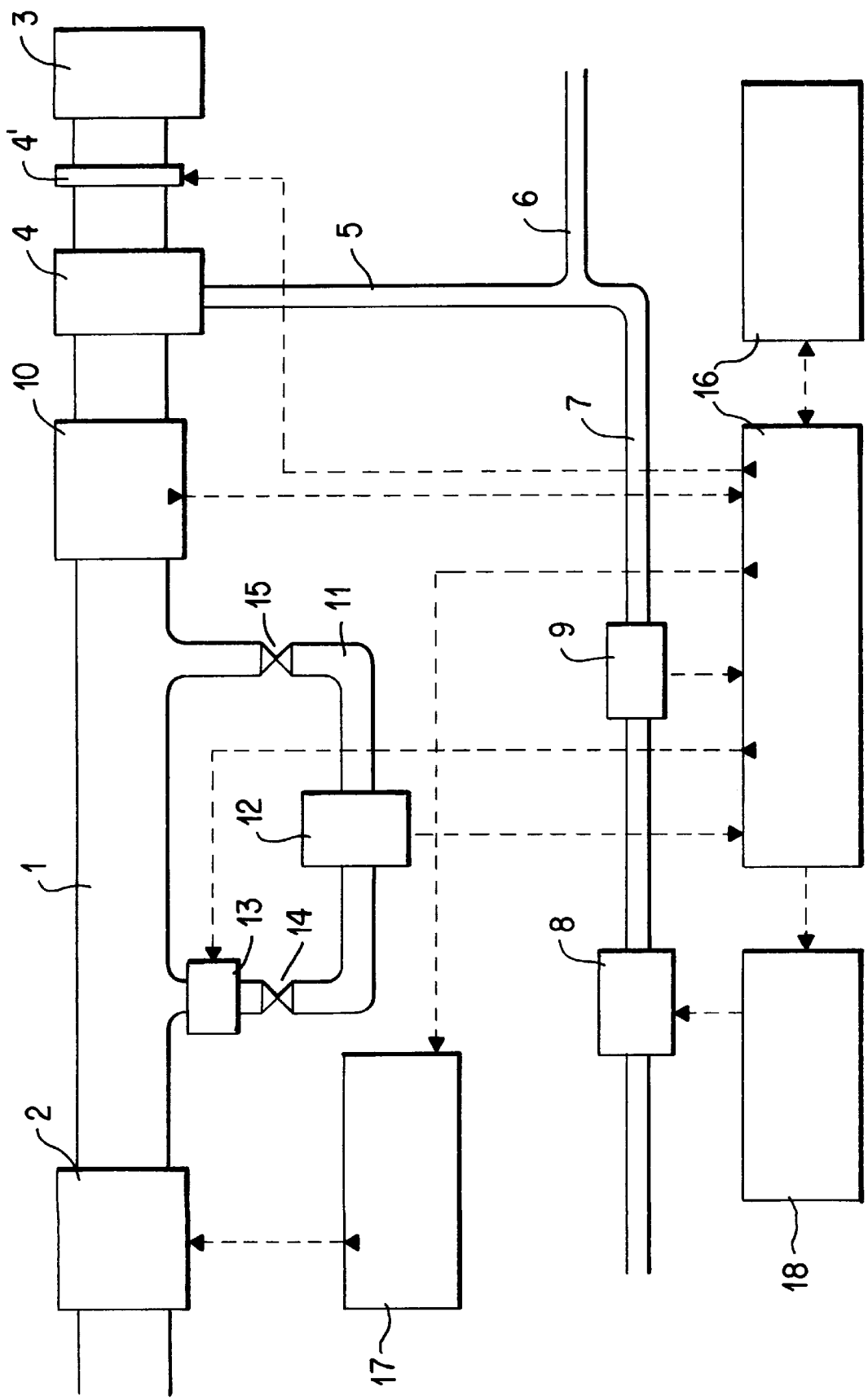

PROCESS AND APPARATUS FOR DEWATERING A SUSPENSION

This application is a 371 at PCT/GB96/00814 filed Apr. 2, 1996.

This invention relates to apparatus and processes for controlling the conditioning and dewatering of a suspension which is continuously flowing towards a continuous dewatering process such as a belt press, a belt thickener or a centrifuge.

Such processes conventionally involve flowing the suspension continuously along a flow line past a conditioner dosing point at which conditioner is dosed into the suspension and on to a dewatering stage at which the conditioned suspension is dewatered.

The effectiveness of the conditioner and dewatering is influenced by the dose of the chosen conditioner and so it is necessary that the amount of conditioner that is added should be controlled carefully.

Conventionally several samples of the suspension are taken from time to time and are subjected to laboratory conditioning tests with varying amounts of one or more conditioners. The optimum conditioner and amount for use at the time of the test is selected and the process is then run utilising that amount of that conditioner, until a subsequent set of tests shows that a variation should be made.

Since the suspension is liable to change from time to time, and to avoid the need for repeated manual testing, it is well known to try to control the amount of conditioner automatically. Thus there have been numerous proposals in the literature to observe a parameter of the process and to control the addition of conditioner in response to this parameter. For instance it is known to monitor the in-flowing suspension and to use some parameter of this to control the addition of conditioner. Unfortunately, many of the methods that have been proposed for monitoring a parameter of the in-flowing suspension have again involved off-line analysis, and this is inconvenient. Other methods have involved in-line monitoring of, for instance flow rate or density, but known methods have not proved satisfactory in practice.

It is also known to monitor the performance of the dewatering process by analysing the solids or liquid recovered from the process. Monitoring the solids (for instance the dry matter of a cake) can be rather difficult and so many of the proposals have involved monitoring the turbidity or other properties of the filtrate (eg a centrate).

Although it might be thought that satisfactory control of the addition of conditioner could be achieved by monitoring the performance of the dewatering process (such as filtrate clarity), in fact there is a fundamental deficiency in such processes. Although they operate satisfactory under substantially steady state conditions, they react only slowly to changes in the suspension. This has the result that a considerable volume of suspension may be dewatered before any change indicated by the quality of the filtrate has resulted in a change in the dosing of flocculant and in a modification of the dewatering conditions. Thus, if the suspension is being dewatered under optimum conditions on a substantially steady basis and the suspension then changes, considerable volumes of suspension may have been dewatered before the filtrate quality has resulted in an effective change in the amount of conditioner which is dosed into the suspension. This is a particular problem with the modern tendency for dewatering apparatus such as centrifuges and belt presses to have a very large capacity.

Even when the process is said to be an automated process, all such processes at present generally require at least one operative substantially permanently observing the process so as to be able to apply manual override if there is, as sometimes occurs, a relatively sudden change in the nature of the suspension or if the dosage control proves inadequate.

Increasing the degree of automation in the addition of the conditioner can (subject to the problems discussed above) be advantageous but in practice it still tends to be unsafe to have the process conducted wholly automatically. As an example, the rate of flow into the belt press or centrifuge or other dewatering apparatus will normally have been selected having regard to the characteristics of a particular sludge or other suspension, and so any change in the suspension may then mean that, irrespective of the amount of conditioner, the dewatering apparatus is no longer operating under optimum conditions.

As indicated above, automated control of the dosing of the conditioner in response to filtrate clarity or other results of the process tends to be unsatisfactory because of the delay in changing dosing conditions. Automated control in response to the rate of flow of the suspension towards the dewatering apparatus is satisfactory if the suspension remains unchanged, but in practice the suspension is liable to change from time to time and the automated dosing then tends to fail. For instance the suspension may be stored in a tank with the result that suspension taken from the top of the tank is likely to have a lower solids content than suspension taken from the bottom of the tank and existing automated systems tend to be inadequate to cope with these variations.

An example of a highly automated control system for the batchwise process on a filter press is the Polykon system developed by Allied Colloids for batch dewatering on a filter press. This is an automated system which, according to the published brochure, can be set to be controlled by varying the amount of polymer by volume-proportional polymer dosing or by mass-proportional polymer dosing, and in the latter instance radiometric densimetry can be used. The amount of polymer is varied automatically during the batch dewatering on the filter press. The process is also described in WO85/02836. However these processes do not contribute to the problem of providing satisfactory and truly automated control for a continuous dewatering process such as a belt process of centrifuge dewatering process.

Schrank and Murren in Water Science Technology Volume 21 1989 pages 1319 to 1324 describe automated processes for operating centrifuge sludge dewatering and they note that changes in the nature of the sludge may influence the requirement for conditioner. They describe processes in which the dry mass per unit time (M) of sludge flowing along a flow line towards the centrifuge is deduced as a result of measurement of the rate of flow of suspension (volume per unit time V) and the suspended solids, ie density, D of the suspension. In addition to measuring M on the inlet side, a turbidity meter monitors the quality of the centrate. It seems that the process is operated initially solely on the basis of an estimated recommendation by the centrifuge manufacturer as to the amount of conditioner that should be added, whereafter the feed-back from the monitoring of the turbidity of the centrate results in the dosage of conditioner being adjusted until optimum turbidity is achieved. Although observation of the dry mass M can reduce some of the delays associated in varying the conditioner in response to the quality of the centrate, it is acknowledged in the article that the use of large centrifuges can result in delays in optimising performances. Accordingly large amounts of cake or centrate may be produced with a quality that is unsatisfactory.

In U.S. Pat. No. 4,612,123 the addition of conditioner to the suspension which is to be dewatered on a belt press is again controlled in response to measurement of the density D and the volume V (leading to the dry mass per unit time M) of the in-flowing suspension, but in this instance reliance is also placed on the rate of flow of filtrate from the belt press.

None of the existing attempts to automate fully a process for conditioning and dewatering a suspension are satisfactory. They all need manual override and essentially continuous manual observation and they are liable to lead to inferior dewatering for considerable periods after there is a change in quality of sludge, It would be desirable to provide a simple system for overcoming these disadvantages.

According to the invention we provide a plant for conditioning and dewatering a suspension comprising dewatering apparatus for substantially continuous dewatering of the suspension, a suspension flow line leading to the dewatering apparatus, suspension flow means for causing substantially continuous flow of the suspension along the flow line, conditioner dosing means for dosing conditioner into the suspension at the dosing point, and control means for controlling the amount of conditioner dosed into the suspension by the dosing means and for controlling the flow means characterised in that the control means comprise on-line density measurement means for measuring the density D of the suspension, on-line flow measurement means for measuring the volume per unit time V at which the suspension flows along the flow line whereby the dry mass per unit time, M, of suspension which flows along the flow line can be calculated, means for automatically selecting the amount A dosed by the dosing means in response to the measured density D and volume V to provide a preselected dose A where A=kM and k is a constant, means for automatically varying the volume V in response to the measured density D to provide a volume V or dry mass M which is preselected according to the value of D, and/or means for automatically varying the constant k in response to the measured density D.

According to the invention we also provide a process for substantially continuously conditioning and dewatering a suspension comprising substantially continuously flowing a suspension along a flow line past a conditioner dosing point to a dewatering apparatus at which the suspension is subjected to substantially continuous dewatering, and in this process we measure automatically on-line the density D of the suspension in the flow line and we measure automatically on-line the volume per unit time V of the suspension in the flow line whereby the dry mass per unit times M, of the suspension flowing along the flow line can be calculated, and we automatically dose into the suspension at the dosing point an amount A of conditioner where A=kM and k is a constant, and we automatically vary the volume V in response to the measured density D to provide a volume V or dry mass M which is preselected according to the value of D, and/or we automatically vary the constant k in response to the measured density D.

In preferred embodiments of the invention we provide for automatic variation of the constant k in response to the measured density D, and in the most preferred embodiments we provide for this and we vary the volume V in response to the measured density D.

Thus, in the invention, we use D and V to control A and additionally we use D to control k (and therefore A) and/or we use D to control V. By this means we are able to provide a fully automated system which does not require continuous manual observation. Also, for the first time, we provide a system in which the conditioner pump and the suspension or sludge pump (ie the conditioner dosing means and the suspension flow means) are both automatically controllable, and in particular they are both controllable in response to variation in, inter alia, the measured density D.

It is generally preferred to provide a mixing device at or after the polymer dosing point and before the dewatering device so as to create turbulence in the flow line with the intention of maximising the mixing of the conditioner into the sludge after dosing and before dewatering. For instance there can be a mixing energy valve such as a motorised gate valve between the polymer dosing point and the dewatering apparatus.

In a preferred aspect of the invention, the mixing energy is automatically selected in response to the volume V and/or density D. As a result of preselecting the amount of mixing that is to be applied at any particular value of V and/or D, it is possible to optimise the mixing energy and thus the conditioning effect.

The invention is based on several deviations from conventional techniques for controlling continuous dewatering processes such as a centrifuge or belt press.

For instance, we rely upon the dry mass per unit time M of the suspension as a primary factor for controlling the amount A of conditioner. This avoids the gross errors that can occur when A depends solely on the flow rate V and it can avoid the major feed back delays which arise when A is adjusted in response to the quality of the filtrate.

Although it might be assumed that k should always be the same constant at any particular dewatering plant, since the suspension would not change very much from day to day, the invention also relies on the fact that one improvement which can be incorporated in the process involves varying the constant k in response to variations in the measured density D.

For a particular plant and suspension, k is selected so as to give substantially optimum dewatering but we have found that the dose required for optimum dewatering (expressed as dry polymer based on dry mass of suspension) may vary if the density of the suspension varies. Thus k is preferably varied according to variation in the density D. Accordingly, by varying the constant k in response to variations in the density D, it is possible automatically to adjust the dosage A so that it is always substantially at the optimum dosage having regard to the density of the suspension, irrespective of changes in the density. Generally k should decrease as the density increases.

For example, when the suspension has a solids content of 1% the optimum dewatering effect with a particular polymeric conditioner might be obtained at 5 kg dry polymer per ton dry mass suspension (so that k is 0.005) but when the density is 5% the optimum dosage might be 3 kg/ton dry mass, so that k is then 0.003.

By referring to optimum dewatering, we mean optimum results in the dewatering parameter of greatest interest. This is sometimes filtrate clarity, but it is usually cake dry matter content.

Instead of, and usually in addition to, varying k in response to the measured density D, the invention preferably also can provide automatic variation in the volume V in response to variation in the measured density D. Thus, variation in D can automatically result in the sludge pump being adjusted so as to vary the rate of flow of suspension along the flow line. Generally V should decrease as D increases, or V can increase as D increases.

This may be done so as to vary either the dry mass load on the dewatering apparatus or the hydraulic load on the dewatering apparatus or both. As a result it is possible to operate the plant automatically at or very near to maximum capacity without the need to have manual supervision to adjust the plant when the density changes such that the plant is then running at over capacity (with some consequential failure in dewatering).

If the primary concern relates to the hydraulic load on the dewatering apparatus then the variation in V may be performed so as to vary the volume of suspension per unit time entering the dewatering apparatus and thus the volume per unit time of filtrate leaving the apparatus. For instance if the system is initially set up to run at a particular rate V for a sludge having a particularly density, it may be necessary to reduce V if the density drops (for instance to prevent the thinner sludge overflowing the belt) or it may be permissible to increase V because the higher solids content may lead to a stiffer rheology and thus may allow more suspension to be held on the belt press. Alternatively, when the primary concern is the dry mass per unit time, again this may be varied upwardly or downwardly in response to variations in the density D.

The method of the invention preferably involves determining k by preliminary flocculation experiments conducted on substantially the same suspension having a density within the range of densities which will be encountered during the process. Any laboratory test or plant trial may be used that will give an adequate indication of the conditioner dose that gives optimum dewatering. The tests should be conducted on a suspension having substantially the same properties as those which will be used in the process, and in practice this means that the trials should be conducted on the suspension and at the plant where the process is to be operated. Further, the trials should be conducted on a suspension having a density between the upper and lower limits that are going to be encountered on that plant. For instance if the density is likely to range from 1 to 5%, then the trials for determining k should generally be conducted at a value between 1 and 5%.

The nature of the laboratory tests or other trials will be selected so as to give a meaningful indication of the optimum in dry cake solids or other dewatering parameter that is to be optimise. Generally maximum attainable dry cake solids are required.

In order to determine how the constant k should be varied in response to the measured density, trials should also be conducted at other densities substantially throughout the entire range that is likely to be encountered at the plant and the value of k at the optimum dosage for each density should thereby be determined.

The variation in the constant k in response to variations in the density can be infinitely variable or variable in very small steps, but it is generally adequate for the variation to be step wise in between 2 and 20 steps covering the range of densities which are likely to be encountered. Often there are at least three steps, but usually not more than 10 and often not more than 6 steps. For instance when the range of densities is mainly between 0.1 and 5% (dry matter based on volume of suspension) each step is typically from 0.5 to 2%, often around 0.7 to 1.3% and most preferably around 1%.

In practice therefore the control means include means for automatically selecting the appropriate value of k according to a preprogrammed range of k values for different densities (selected on the basis of the actual laboratory or other tests or trials) and according to the particular density which is being recorded at that time.

The invention is of particular value for continuous filtration systems, namely belt thickeners or, especially, belt presses but it can be applied to any continuous feed to a dewatering stage. It can be applied to continuous centrifugal dewatering (or thickening) processes or even to sedimentation.

The suspension can be, for instance, a mineral suspension but preferably it is a sewage suspension, in particular a sewage sludge. Thus the invention is of particular value for the belt press dewatering of municipal effluent, especially sewage sludge.

The overall apparatus, including the belt press, centrifuge or other dewatering apparatus, the flow line, the sludge pump or other suspension pump and the conditioner dosing pump or other dosing means can be conventional.

The on-line flow measurement means can be any conventional electromagnetic or other flow meter.

The on-line density measurement means can be any on-line apparatus suitable for measuring the density of the suspension. It can be a radiometric apparatus, for instance as described in Process Industry Journal March 1991 "Waste Water Treatment Solids Measurement for Sludge Dewatering" by Theirsen and Lock or it can be any of the density measurement systems mentioned by Schrank and Murren (see above).

The rate of flow of the suspension and the density of the suspension are both measured on-line, and thus it is not necessary to take samples from the suspension to a laboratory and analyse the samples in the laboratory. Instead, the density and flow rates can be determined either in the main flow line of the suspension or in a position that can be in fluid contact with the suspension in the flow line. For instance the density can be determined in a spur from or, more usually, a by-pass to the flow line. The by-pass can be valved at its inlet and/or its outlet in order to allow isolation of the sample in the by-pass from the suspension flowing through the flow line.

Preferably means are provided to minimise errors due to gas bubbles in the suspension. For instance the on-line density measurement may be conducted in a by-pass and a back pressure valve may be included in the by-pass line between the density measuring apparatus and the return of the by-pass to the flow line. The purpose of this is to maintain the sludge in the by-pass under a positive pressure so that any case in the sludge remains in the solution or as micro-bubbles and does not form bubbles sufficiently large to distort the density measurement.

The density and rate of flow should be measured at points in the flow line at which meaningful measurements can be made. Preferably the density, and often also the rate of flow, are measured prior to the dosing point but usually reasonably close to it.

The conditioner can be any chemical which has a beneficial effect on dewatering and thus is generally referred to as a flocculant. It can be an inorganic coagulant such as alum or other polyvalent cationic inorganic coagulant. It can be a polymeric coagulant flocculant, for instance a water-soluble polymer having IV 0.1 to 3 dl/g and a cationic charge of at least 4 meq/g. Examples are polyethyleneimine, polyamines, and low molecular polymers of cationic monomer optionally with small amounts (eg 0–20%) comonomer such as acrylamide. Suitable cationic monomers include diallyl dimethyl ammonium chloride and dialkylaminoethyl (meth) acrylate quaternary or acid addition salts. It can be a polymeric bridging flocculant, for instance a water-soluble polymer having IV at least 4 dl/g and which may be non-ionic, anionic or cationic. Generally they are polymers of acrylamide or other ethylenically unsaturated monomer alone or with ethylenically unsaturated cationic monomer and/or anionic monomer. Typical bridging flocculants are well known. IV is intrinsic viscosity measured at 25° C. on a 1N NaCl solution buffered at pH 7.5 using a suspended level viscometer.

Although an advantage of the invention is that the plant can be operated wholly automatically and without reliance on feed-back from the dewatering process (for instance filtrate quality) it can be useful to have facilities for manual control (or for further automatic control) or for such feedback. This can be particularly useful during start-up. For instance the apparatus may include at least one observation station to allow the making of observations of the process so as to allow the control to be overridden if these observations indicate that it is desirable. For instance there can be an observation station for observing a property (usually not density) of the suspension.

As an example, there can be a window in the flow line or other location to allow the visual appearance of the suspension to be observed before dewatering, either after the flocculant dosing point or before it. Observation by the skilled naked eye of a sewage sludge or other suspension that is to be dewatered can indicate variations in it, and the need for adjustment of the polymer dose, very quickly and can allow for the ratio to be adjusted earlier than would be indicated by the automatic control.

Instead of observing the suspension visually, various tests (additional to density) can be conducted on the suspension before dewatering. For instance the charge of the suspension after some or all of the flocculant has been added can be determined in known manner such as by a streaming current detector or on-line charge titration system. Additionally or alternatively the filterability of the suspension, generally after adding the flocculant, can be determined by a technique as described in WO94/17895.

Instead of or in addition to providing manual and/or automatic override in response to observation of the suspension, there can be manual and/or automatic override in response to observation of the solids separated by the dewatering or the water separated by the dewatering. For instance cake moisture and/or cake thickness can be determined, often on-line, and the results used to override the main control system.

Another way of overriding the system is by manual or automatic response to observation of the water separated by the dewatering, usually by measuring turbidity.

The override usually includes manual override, for instance in response to visual observation of the suspension. However it can also include automatic override. For instance the preselected dose:mass ratio (A=kM) may be achieved by automatic control in response to the density and flow rate measurement and if, despite maintaining this value constant, variations in filtrate clarity or other process parameters are observed then the ratio may be adjusted automatically in response to the variation in turbidity or other property so as to maintain constant output quality.

The accompanying drawing is a schematic representation of a typical apparatus incorporating the invention.

A flow line 1 is a closed pipe or other conventional duct and leads up to and from a monopump 2 or other suitable pumping apparatus for causing the suspension to flow along the flow line 1 towards a belt press or other suitable dewatering apparatus 3 which is provided with a filtrate outlet (not shown) and means for removing filter cake (not shown).

Polymeric flocculant is dosed into the suspension by a dosing point 4 which can be any conventional mixing device for adding polymeric flocculant into the suspension. This mixer, or an optional subsequent mixer 4', can be controllable in response to the density or flow rate or both. The dosing point is supplied with a solution of polymer through line 5, this solution being provided by mixing appropriate amounts of dilution water from pipe 6 and polymer through line 7. Polymer is caused to flow along line 7 and towards the dosing point 4 by polymer monopump or other suitable pumping apparatus 8. The rate of flow of polymer is checked by flow meter 9.

A flow meter 10 is provided in the service line 1 for determining the rate of flow of sewage sludge or other suspension along the flow line. Any convenient flow meter suitable for determining the flow per unit time can be used. A preferred flow meter is an electromagnetic flow meter of the type conventionally used for measuring the volume flow of sewage sludge or other suspension.

The flow line may be provided with a by-pass 11 in which a radiometric or other suitable density gauge 12 may be fitted. Alternatively, the radiometric density gauge 12 may be fitted in the flow line 1. If it is fitted in a by-pass, conveniently there is a by-pass pump 13 and valves 14 and 15 to cause appropriate flow of the suspension through the by-pass when it is desired to measure density, and to allow the gauge 12 to be isolated from the service flow when appropriate by closing valves 14 and 15. The valves are preferably adjusted to ensure that there is sufficient pressure in the by-pass to prevent serious bubble formation.

There is a computer control system, typically including a PLC and MMI, shown diagrammatically as 16 associated with an inverter 17 for controlling the operation of pump 2, and therefore the flow of the suspension. There is an inverter 18 for controlling the pump 8 and therefore the rate of supply of polymer to the dosing point 4. The computer 16 receives signals from the flow meter 10 and from the density gauge 12, and also from the flow meter 9.

In use, a laboratory jar test process, or experience based on prior treatment of a similar suspension, at the same plant is used to select k for a range of densities. For instance such tests may indicate that, for instance, the amount of conditioner should be 5 kg/ton dry matter at densities up to 2%, 4 kg/ton at densities of 2 to 3%, 3.5 kg/ton at densities of 3 to 4% and 3 kg/ton dry matter at densities of 4 to 5%. This information is programmed into the computer 16 and the computer automatically records the flow rate from the meter 10 and the density from the radiometric density gauge 12 and varies the rate of flow of polymer by varying the pump 8 as necessary so as to achieve and maintain the preselected dose:mass ratio for the particular density which is being recorded at any particular time.

Additionally, the computer is pre-programmed to vary the rate of pumping by the sludge pump 2, and thus to vary V, according to variations in the density so as to maintain either a constant hydraulic load or a constant dry matter feed to the dewatering apparatus.

We claim:
1. A plant for conditioning and dewatering a suspension comprising a continuous filtration system or a continuous centrifugal dewatering system as a dewatering apparatus 3 for substantially continuous dewatering of the suspension, suspension flow line 1 leading to the de-watering apparatus 3, suspension flow means 2 for causing substantially continuous flow of the suspension along flow line 1, conditioner dosing means 5, 6, 7, 8, 9 for dosing conditioner into the suspension at a dosing point 4, and control means for controlling the amount of conditioner dosed into the suspension by the dosing means and for controlling the flow means characterised in that the control means comprise on-line density measurement means 12 for measuring the density D of the suspension, on-line flow measurement means 10 for measuring the volume per unit time V at which the suspension flows along the flow line whereby the dry mass per unit time, M, of suspension which flows along the flow line can be calculated, means 16, 17, 18 for automatically selecting an amount A of conditioner dosed by the dosing means in response to the measured density D and volume per unit time V to provide a preselected dose A where A=kM and k is a constant, means 16, 17, 18 for automatically varying the volume per unit time V in response to the measured density D to provide a volume V or dry mass M per unit time which is preselected according to the value of D and/or means 16, 17, 18 for automatically varying the constant k in response to the measured density D.

2. A plant according to claim 1 in which the means 16, 17, 18 are for automatically selecting the amount A dosed by the dosing means 4 in response to the measured density D and the volume per unit time V to provide a preselected dose A where A=kM and k is a constant, and for automatically varying the volume per unit time V in response to the measured density D to provide a dry mass per unit time M which is preselected according to the value of D.

3. A plant according to claim 1 in which the means 16, 17 and 18 are for automatically selecting the amount A dosed by the dosing means 4 in response to the measure density D and volume per unit time V to provide a preselected dose A where A=kM and k as a constant, and for automatically varying the volume per unit time V in response to the measured density D to provide a volume V or dry mass per unit time M which is preselected according to the value of D, and for automatically varying the constant k in response to the measured density D.

4. A plant according to any preceding claim additionally including means for automatically selecting the mixing energy by which the conditioner is mixed into the suspension at or after the dosing point in response to the volume V and/or the density D.

5. A process for substantially continuously conditioning and dewatering a suspension comprising substantially continuously flowing a suspension along a flow line 1 past a conditioner dosing point 4 to a continuous filtration system or a continuous centrifugal dewatering system as a dewatering apparatus 3 at which the suspension is subjected to substantially continuous dewatering, and in this process the density D of the suspension in the flow line 1 is measured automatically on-line and the volume per unit time V of the suspension in the flow line 1 is measured automatically on-line whereby the dry mass per unit time, M, of the suspension flowing along the flow line 1 can be calculated, and conditioner is automatically dosed into the suspension at the dosing point 4 in an amount A where A=kM and k is a constant, and the volume V of suspension flowing along the flow line 1 is automatically varied in response to the measured density D to provide a volume V or dry mass M which is preselected according to the value of D and/or the constant k is varied automatically in response to the measured density D.

6. A process according to claim 5 in which flocculant is automatically dosed into the suspension at the dosing point in an amount A where A=kM and k is a constant and the volume V of suspension flowing along the flow line is automatically varied in response to the measured density D to provide a dry mass M which is preselected according to the value of D.

7. A process according to claim 5 or 6 in which conditioner is automatically dosed into the suspension at the dosing point in an amount A where A=kM and k is a constant, the volume V of suspension flowing along the line is automatically varied in response to the measured density D to provide a volume V or a dry mass M which is preselected according to the value of D, and the constant k is varied automatically in response to the measured density D.

8. A process according to claim 5 in which the conditioner is mixed into the suspension at or after the dosing point with a mixing energy which is selected automatically in response to the volume V and/or density D.

9. A process according to claim 5 comprising the preliminary step of selecting k by preliminary flocculation experiments conducted on the suspension and at the plant where the process is to be conducted.

10. A process according to claim 9 in which the dewatering is by a belt press, belt thickener or centrifuge and the preliminary flocculation experiments are conducted to select k to give optimum dry cake solids.

* * * * *